United States Patent [19]

Bautista, Jr.

[11] 4,348,904

[45] Sep. 14, 1982

[54] ACOUSTIC IMPEDANCE MATCHING DEVICE

[75] Inventor: Peter Bautista, Jr., Buena Park, Calif.

[73] Assignee: North American Philips Corporation, New York, N.Y.

[21] Appl. No.: 176,312

[22] Filed: Aug. 8, 1980

[51] Int. Cl.$^{3}$ .......... G01N 29/00

[52] U.S. Cl. .......... 73/644

[58] Field of Search .......... 73/644, 632, 626; 310/322, 328, 334, 335, 336

[56] References Cited

U.S. PATENT DOCUMENTS

| | | | |
|---|---|---|---|
| 3,663,842 | 5/1972 | Miller | 73/644 |
| 3,872,332 | 3/1975 | Butter | 310/334 |
| 3,971,962 | 7/1976 | Green | 73/641 |
| 4,101,795 | 7/1978 | Fukumoto et al. | 310/336 |

*Primary Examiner*—Stephen A. Kreitman
*Attorney, Agent, or Firm*—Jack E. Haken

[57] ABSTRACT

An acoustic impedance matching structure, intended primarily for use with ultrasound transducers in medical imaging applications comprises an elastomer mesh embedded in metal-loaded plastic resin.

17 Claims, 7 Drawing Figures

ACOUSTIC IMPEDANCE MATCHING DEVICE

The invention relates to apparatus for transmitting acoustic energy. More specifically the invention relates to a structure for matching the impedance of acoustic transducers to the impedance of a test object. Typically, an array of such transducers is used in medical diagnostic imaging and the test object comprises human tissue.

BACKGROUND OF THE INVENTION

Echo ultrasound techniques are a popular modality for imaging structures within the human body. One or more ultrasound transducers are utilized to project ultrasound energy into the body. The energy is reflected from impedance discontinuities associated with organ boundaries and other structures within the body; the resultant echoes are detected by one or more ultrasound transducers (which may be the same transducers used to transmit the energy). Detected echo signals are processed, using well known techniques, to produce images of the body structures. In one such technique, a narrow beam of ultrasound energy is scanned across the body to provide image information in a body plane.

A beam of ultrasound may be scanned across a body by sequentially activating individual ultrasound transducer elements in a linear array of such elements. Apparatus of this type is described, for example, in the article Medical Ultrasound Imaging: An Overview of Principles and Instrumentation, J. F. Havlice and J. C. Taenzer, Proceedings of the IEEE, Vol. 67, No. 4, April 1979, page 620 and in the article Methods and Terminology for Diagnostic Ultrasound Imaging Systems, M. G. Maginness, page 641 of the same publication. Those articles are incorporated by reference herein as background material.

Efficient coupling of ultrasound energy from a transducer or array of transducers to a body or other object undergoing examination requires that the acoustic impedance of the transducer be matched to that of the test object. Ultrasound transducers typically used in medical applications comprise ceramics having an acoustic impedance of approximately $30\times10^6$ kg/M$^2$sec. Human tissue has an acoustic impedance of approximately $1.5\times10^6$ kg/M$^2$sec; thus an impedance matching structure is usually required between transducer ceramics and human tissue. Quarterwave matching windows, for example of the type described in U.S. patent application Ser. No. 104,516 filed on or about Dec. 17, 1979 (now abandoned), are commonly used for this purpose.

Wideband ultrasound pulses are typically utilized in medical imaging apparatus. Ideally, an impedance matching structure which couples pulses from the transducer to the human tissue should have a Gaussian frequency response as illustrated in FIG. 1. However, theoretical and experimental studies have shown that if a transducer is backed with air, a single quarterwave matching window will produce a double peaked frequency response of the type illustrated in FIG. 2. The prior art has recognized that a frequency response characteristic which approaches the ideal Gaussian may be achieved with an impedance matching structure comprising two or more quarterwave matching layers in cascade (that is one overlaying the other). The production of cascade matching structures of this type requires precise control of the layer thickness. Although such structures may be produced on experimental transducer arrays which are constructed from precision ground ceramic plates of uniform thickness, they are impractical for economical production of transducers which are generally formed from cast ceramic plates and which may warp or have varying thickness.

U.S. Pat. No. 4,326,418 represents another prior art solution to the impedance matching problem. That application describes an impedance matching structure having periodic, staircase-like thickness variations which effectively produce a Gaussian frequency response. While highly effective, the impedance matching structure described therein is relatively expensive to produce since either the periodic structure or the dies from which it is cast must be produced by a large number of precision machining operations.

SUMMARY OF THE INVENTION

In accordance with the invention, an impedance matching structure comprises a fiber grid having a relatively low acoustic impedance which is imbedded in a layer of plastic resin. The resin may be loaded with a high density metal powder. In a preferred embodiment the metal powder settles against the fibers of the mesh to form a high acoustic impedance layer having quasiperiodic thickness variations which is embedded within the thicker resin layer. A single peaked frequency response, which approaches the ideal Gaussian, is thus achieved. The structure may be formed by a casting operation, which does not require precision dies, and thus lends itself to economical transducer fabrication.

BRIEF DESCRIPTION OF THE DRAWINGS

The invention may be understood by reference to the accompanying drawings in which.

DESCRIPTION OF A PREFERRED EMBODIMENT

Figure 1:
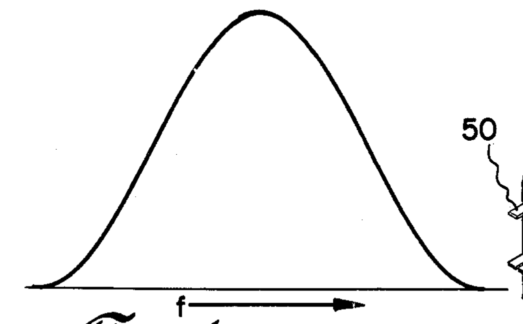
FIG. 1 is an ideal frequency response characteristic for a wideband matching structure.
Figure 2:
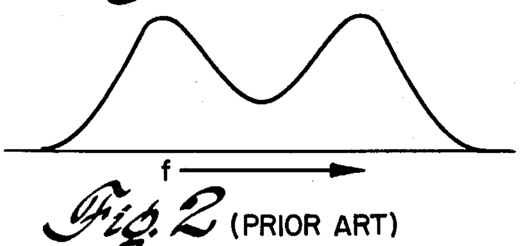
Fig.2 (PRIOR ART)
FIG. 2 is the frequency response of a single layer matching structure of the prior art.
Figure 3:
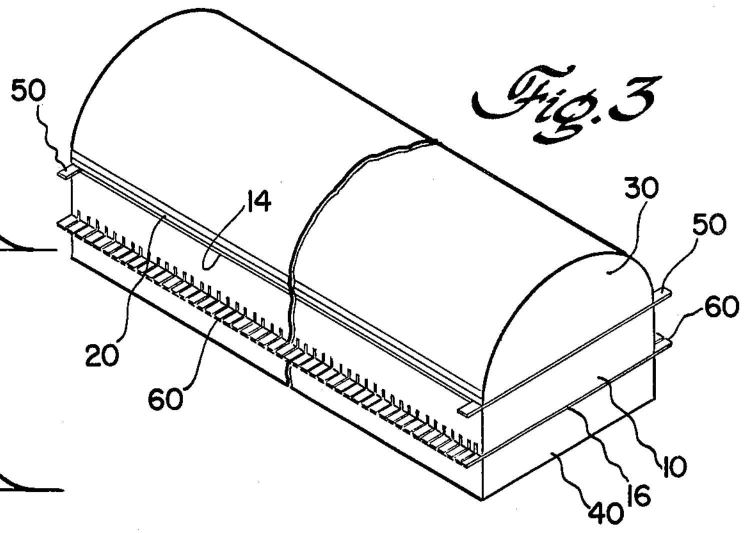
FIG. 3 is a transducer array which includes a matching device of the present invention.
Figure 5:
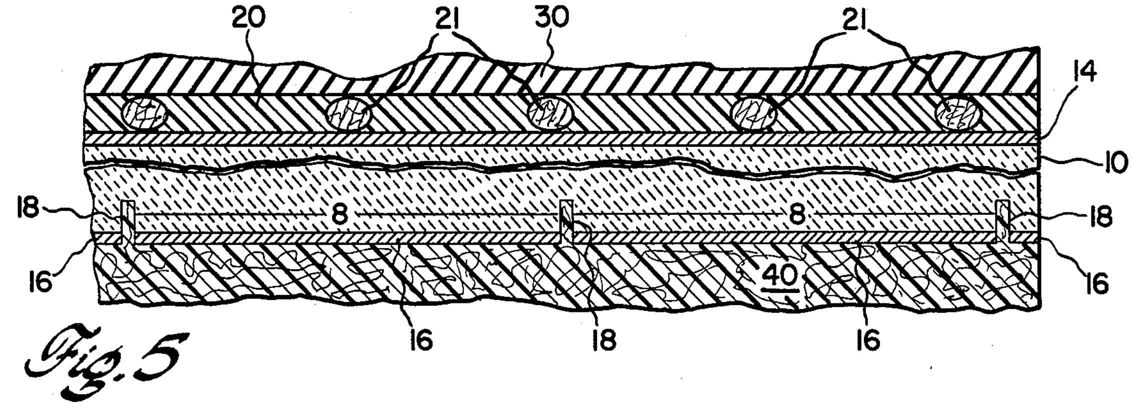
FIG. 5 is a detailed section of the transducer array of FIG. 3.
Figure 4:
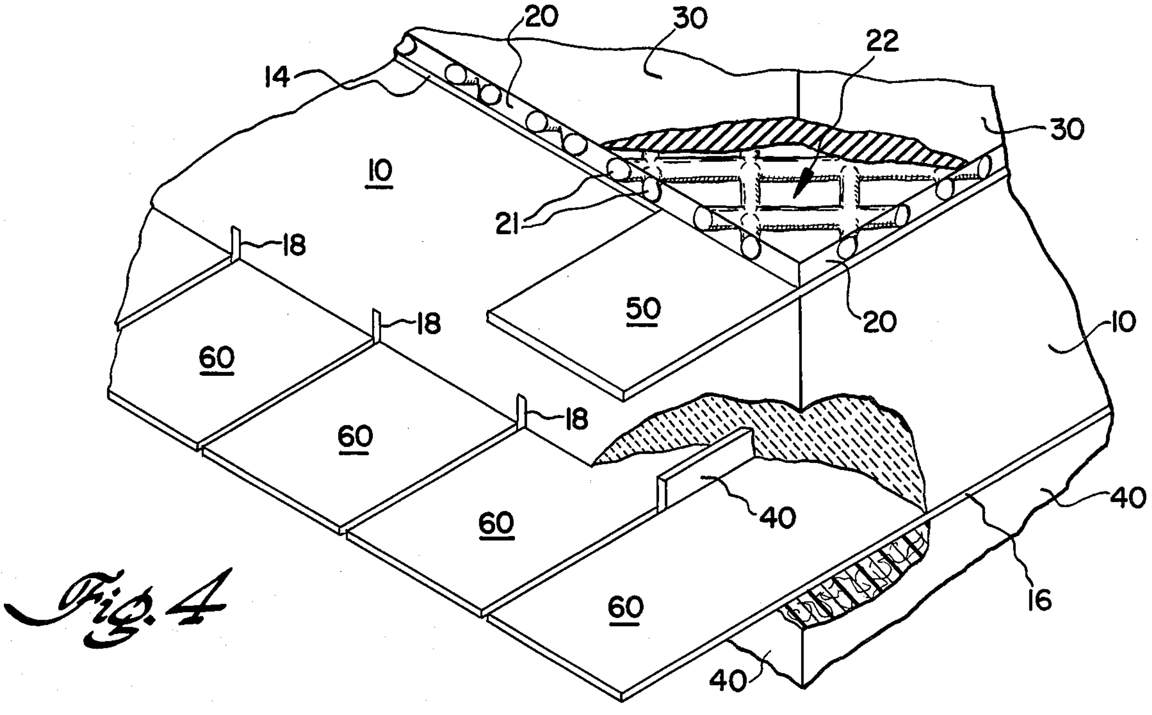
FIG. 4 is a detailed view of one corner of the transducer array of FIG. 3.

FIGS. 3, 4, and 5 illustrate a preferred embodiment of the invention which comprises a linear array of transducer elements. The elements are formed from a single rectangular block of piezoelectric material 10 which may, for example, comprise a type PZT-5 ceramic. For typical medical applications the ceramic block 10 has a thickness resonance of approximately 3.5 mHz.

The active front surface of the ceramic block 10 is provided with a silver electrode 14, as is the back surface. The back surface of the ceramic block 10 is attached to a copper electrode 16 with a conductive epoxy adhesive. The individual transducer elements 8 are then separated by a series of parallel slots 18, which are oriented perpendicular to a scanning axis of the array, on the back surface across the width of the ceramic and copper electrode. A typical transducer array is produced from a ceramic block having a width of 16.9 mm and a length of 97.5 mm; 72 individual transducer elements, each 1.28 mm long, are produced by sawing the bar, through approximately 10% of its thickness, with a series of kerfs using a 0.06 mm diamond saw. A matching structure 20 of sound conductive material is disposed over the front surface of the front electrode 14. In a preferred embodiment (FIG. 4) the matching structure comprises a plastic elastomer mesh embedded in a resin which is loaded with high density metal particles. The specific structure and construction of the matching layer is further described below with respect to FIGS. 6 and 7.

The transducers are backed with a lossy air cell 40 (which may for example comprise epoxy resin loaded with glass micro-balloons) which is bonded to the surface of the back electrode 16 and fills the slots 18. Focussing across the width of the array may be achieved by casting a cylindrical acoustic lens 30 directly over the front of the matching structure. Typically the lens may comprise silicone rubber.

Extensions of the back electrodes 16 on the surface of each transducer may be brought out of the sides of the array as tabs 60. Likewise, an extension of the front electrode 14 may be brought out of the side of the array as tabs 50. In a preferred embodiment, the two end transducer elements of the array are inactive; tabs from the front electrode 50 are folded down to contact the back electrodes on those end elements to provide a ground plane connection.

Figure 6:
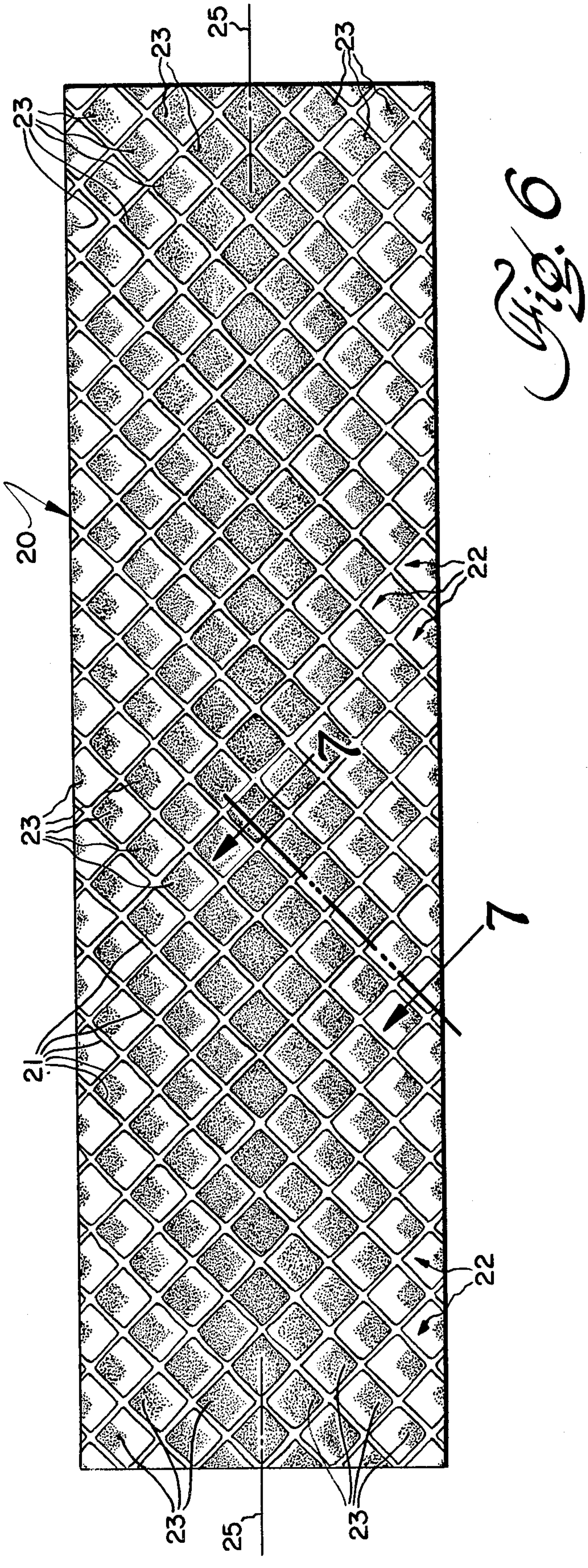
FIG. 6 is a top view of the matching device of the present invention.
Figure 7:
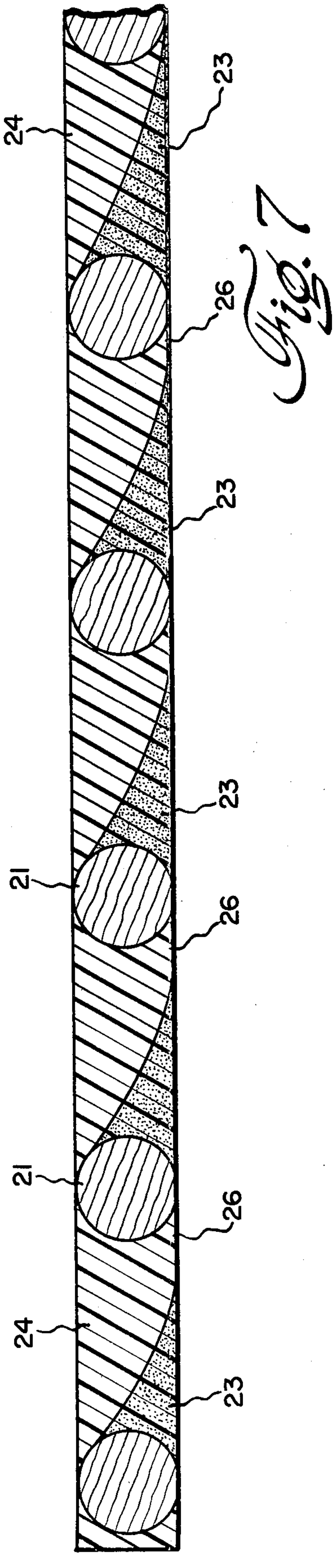
FIG. 7 is a sectional view of the matching device of FIG. 6 taken along the indicated diagonal.

FIGS. 6 and 7 illustrate the structure of the matching layer. The layer is formed from a plastic elastomer mesh grid comprising strands 21 which is embedeed in a plastic resin 24. The resin is loaded with high density metal particles. In a preferred embodiment the loaded resin is cast around the mesh and the metal particles settle adjacent the mesh strands to provide an array of high density loaded regions 23 which are disposed in a two-dimensional quasiperiodic fashion within the layer. The grid of fiber strands controls the thickness of the matching layer. In a preferred embodiment the width of the high density regions 23 is greatest along the central line 25 of the array and decreases as a function of the distance between the region and the central line of the array. The ratio of open area to fiber area in the mesh controls the distribution of the powder. The metal particles tend to pile along the edges of the strands to form roughly triangular regions 23 which, in regions adjacent the edges of the array, are separated from adjacent fibers by regions of unloaded resin 26.

Ideally, the acoustic impedance of the loaded resin regions 23 should be the geometric mean of the acoustic impedances of the transducer and of the test object. The acoustic impedance of the mesh fibers and of the unloaded regions 24 of the resin should be substantially lower than that of the loaded resin and may approach the impedance of the test object.

In a typical preferred embodiment, intended for use at 3.5 mHz, (FIG. 6) the mesh is a nylon netting comprising perpendicular strands 21 which are knotted at the crossover points and define substantially square cells 22. Each strand of the net is formed from a twisted pair of 0.058 millimeter nylon threads. The sides of the individual cells are approximately 1.01 mm long. The mesh is approximately 0.152 mm thick before it is cast into the resin and expands to be approximately 0.178 mm thick after casting. In a preferred embodiment the strands are oriented to form an angle of approximately 45° with the scanning axis of a transducer array.

In practice, the matching layer is cast directly over the front silver electrode of the transducer. The silver electrode is first scrubbed with a fiberglass brush to remove any oxide surface layer. The electrode and mesh are degreased in an alcohol wash. The mesh is then placed on the electrode surface and is degassed in a vacuum chamber. A metal loaded epoxy resin is then poured uniformly along the center line of the surface of the mesh. In a preferred embodiment the resin comprises Hobby Poxy Formula 2 manufactured by the Petite Paint Company, 36 Pine St., Rockaway, N.J. The resin is loaded with a 325 mesh tungsten powder in a ratio of 1.6 to 1.0 (tungsten to expoxy). The resin is then degassed under vacuum. A Mylar release sheet is placed over the surface of the resin layer and a flat glass sheet is clamped over the assembly. The resin is cured for 24 hours at 40° C.

The tungsten powder settles on the electrode surface in the cells 22 and piles against the mesh strands as the resin cures. FIG. 7 is a sectional view of the cast layer taken parallel to one of the mesh strands. The settling action of the metal powder effectively segregates the material in the mesh cells into regions of substantially unloaded resin 24 having a relatively low acoustic impedance and regions of loaded resin 23 having a substantially higher acoustic impedance. The loaded regions are of substantially triangular cross-section and substantially fill the cells along the center line of the array. At the edges of the array the loaded regions may be separated from the two outside edges of the cell by an unloaded region 25. The resultant two-dimensional quasiperiodic structure of loaded resin has an approximately Gaussian frequency response characteristic and is ideally suited for matching tranducer arrays in medical applications.

The matching devices have been described herein with respect to preferred embodiments for use with a flat transducer array. Those skilled in the art will recognize, however, that the device is equally useful with curved transducer arrays and with single element transducers. Likewise, although a preferred embodiment has been described for use at 3.5 mHz; the structures are also efficient impedance matching devices at other frequencies used for medical imaging.

What is claimed is:

1. An impedence matching device for coupling wideband acoustic energy between an active surface of one or more acoustic transducers having a first acoustic impedence and an object having a second acoustic impedence, comprising:

a layer of sound conductive material having an acoustic impedence intermediate the first acoustic impedence and the second acoustic impedence disposed over the active surface of the transducers; and a mesh disposed over the active surface of the transducers, the mesh having strands which define open spaces therebetween; wherein the sound conductive material comprises loaded regions which are disposed within the open spaces of the mesh and which have an acoustic impedence which is greater than the acoustic impedence of the mesh and further comprises an unloaded region which has an acoustic impedence which is lower than the acoustic impedence of the loaded regions.

2. The device of claim 1 wherein the loaded regions are wholly contained within the open spaces defined by the strands of the mesh.

3. The device of claim 1 wherein the thickness of each loaded region tapers from a maximum thickness which is less than or equal to the thickness of the mesh to a smaller thickness.

4. The device of claim 1 wherein the loaded regions are disposed on the active surface of the transducer and wherein the unloaded region overlies at least the loaded regions.

5. The device of claim 4 wherein the thickness of each loaded region tapers from a maximum thickness which is less than or equal to the thickness of the mesh to a smaller thickness.

6. The device of claim 3 or 5 wherein the sound conductive material comprises a high density powder in a resin binder.

7. The device of claim 6 wherein the high density powder comprises tungsten powder.

8. The device of claim 5 wherein the transducers comprise an array of transducer elements disposed in a line along a scanning axis.

9. The device of claim 8 wherein the mesh comprises substantially perpendicular strands which are disposed at an angle of approximately 45° to the line of the array.

10. The device of claim 5 wherein the loaded regions comprise resin loaded with high density powder and the unloaded regions comprise resin which is substantially free of high density powder.

11. The device of claim 10 or 5 wherein the loaded regions have a substantially triangular cross-section.

12. A wideband acoustic transducer assembly comprising:

a linear array of acoustic transducer elements formed in a sheet of piezoelectric material, the sheet having a front active surface and a back surface which is opposite the front surface;

a lossy backing layer disposed adjacent the back surface of the sheets; and the matching device of claim 11 disposed over the active surface of the sheet.

13. The device of claim 8, 4 or 5 wherein the mesh is composed of strands which define substantially square cells, wherein the transducer comprises an array of transducer elements having a scanning axis, wherein the width of the loaded regions is approximately equal to the width of the cells along a center line of the array which is parallel to the axis and wherein the width of the loaded regions is less than the width of the cells at the edges of the array.

14. A wideband acoustic transducer assembly comprising:

a linear array of acoustic transducer elements formed in a sheet of piezoelectric material, the sheet having a front active surface and a back surface which is opposite the front surface;

a lossy backing layer disposed adjacent the back surface of the sheets; and the matching device of claim 13 disposed over the active surface of the sheet.

15. A wideband acoustic transducer assembly comprising:

a linear array of acoustic transducer elements formed in a sheet of piezoelectric material, the sheet having a front active surface and a back surface which is opposite the front surface;

a lossy backing layer disposed adjacent the back surface of the sheets; and the matching device of claim 1, 2, 3, 4, 5, or 10 disposed over the active surface of the sheet.

16. The device of claim 1 wherein the frequency response characteristic of the impedance matching device is approximately Gaussian.

17. The device of claim 1 or 5, wherein the mesh comprises nylon netting.

* * * * *